(12) United States Patent
Renault

(10) Patent No.: US 12,030,364 B2
(45) Date of Patent: Jul. 9, 2024

(54) PRESSURE REGULATOR WARM UP SYSTEM FOR A TRANSPORT REFRIGERATION UNIT

(71) Applicant: Carrier Corporation, Palm Beach Gardens, FL (US)

(72) Inventor: Loic Renault, Saint Etienne du Rouvray (FR)

(73) Assignee: CARRIER CORPORATION, Palm Beach Gardens, FL (US)

(*) Notice: Subject to any disclaimer, the term of this patent is extended or adjusted under 35 U.S.C. 154(b) by 553 days.

(21) Appl. No.: 17/251,161

(22) PCT Filed: Sep. 26, 2018

(86) PCT No.: PCT/IB2018/001217
§ 371 (c)(1),
(2) Date: Dec. 10, 2020

(87) PCT Pub. No.: WO2020/065363
PCT Pub. Date: Apr. 2, 2020

(65) Prior Publication Data
US 2021/0260961 A1    Aug. 26, 2021

(51) Int. Cl.
*B60H 1/20* (2006.01)
*B60H 1/00* (2006.01)
(Continued)

(52) U.S. Cl.
CPC ........... *B60H 1/20* (2013.01); *B60H 1/00271* (2013.01); *F01N 1/02* (2013.01); *F01N 3/0205* (2013.01);
(Continued)

(58) Field of Classification Search
CPC ........... F01N 1/02; F01N 3/0205; F02G 5/02; F02M 21/0221; F02M 21/0227;
(Continued)

(56) References Cited

U.S. PATENT DOCUMENTS 3,367,131 A    2/1968  Foessl
3,527,289 A    9/1970  Foessl
(Continued)

FOREIGN PATENT DOCUMENTS

CN    207702815 U    8/2018
EP    2441935 A1    4/2012
(Continued)

OTHER PUBLICATIONS

International Search Report dated May 15, 2019; International Application No. PCT/IB2018/001217; International Filing Date Sep. 26, 2018 (3 pgs).
(Continued)

*Primary Examiner* — Nael N Babaa
(74) *Attorney, Agent, or Firm* — CANTOR COLBURN LLP

(57) ABSTRACT

A method of warming a valve assembly includes receiving an exhaust flow through a first heat exchanger first inlet; heating a coolant received through a first heat exchanger second inlet with the exhaust flow; exhausting the exhaust flow through a first heat exchanger first outlet; and discharging heated coolant through a first heat exchanger second outlet towards a second heat exchanger assembly that is coupled to the valve assembly to heat the valve assembly.

17 Claims, 2 Drawing Sheets

(51) Int. Cl.
  *F01N 1/02* (2006.01)
  *F01N 3/02* (2006.01)
  *F02G 5/02* (2006.01)
  *F02M 21/02* (2006.01)

(52) U.S. Cl.
  CPC ........... *F02G 5/02* (2013.01); *F02M 21/0221* (2013.01); *F02M 21/0227* (2013.01); *F02M 21/023* (2013.01); *F01P 2060/00* (2013.01)

(58) Field of Classification Search
  CPC ..... F02M 21/023; F01P 2060/00; B60H 1/20; B60H 1/00271
  See application file for complete search history.

(56) References Cited

U.S. PATENT DOCUMENTS

| | | | |
|---|---|---|---|
| 4,172,493 | A | 10/1979 | Jacobs |
| 4,850,197 | A | 7/1989 | Taylor et al. |
| 8,752,397 | B2 | 6/2014 | Yamashita et al. |
| 9,134,058 | B2 | 9/2015 | Ikemiya et al. |
| 9,789,744 | B2 | 10/2017 | Steele et al. |
| 2008/0148748 | A1* | 6/2008 | Viegas ..................... B60P 3/20 62/239 |
| 2012/0055180 | A1 | 3/2012 | Larson et al. |
| 2013/0333668 | A1 | 12/2013 | Coldren et al. |
| 2014/0182559 | A1 | 7/2014 | Steffen et al. |
| 2018/0195789 | A1 | 7/2018 | Swab |
| 2018/0202703 | A1 | 7/2018 | Ferguson |

FOREIGN PATENT DOCUMENTS

| | | |
|---|---|---|
| FR | 2525330 A1 | 10/1983 |
| JP | 08165925 | 6/1996 |
| JP | H11190581 A | 7/1999 |
| JP | 2014115027 A | 6/2014 |
| WO | 2017161425 A1 | 9/2017 |
| WO | 2018051164 A1 | 3/2018 |

OTHER PUBLICATIONS

Written Opinion dated May 15, 2019; International Application No. PCT/IB2018/001217; International Filing Date Sep. 26, 2018 (8 pgs).

* cited by examiner

PRESSURE REGULATOR WARM UP SYSTEM FOR A TRANSPORT REFRIGERATION UNIT

CROSS REFERENCE TO RELATED APPLICATIONS

This application is a National Stage application of PCT/IB2018/001217, filed Sep. 26, 2018, which is incorporated by reference in its entirety herein.

BACKGROUND

The following description relates to transport refrigeration units.

Conventional trucking vehicles are typically provided with at least one tank that stores fuel to be used in the TRU. During certain operating conditions, a pressure regulating valve may freeze or frost, inhibiting the delivery of fuel to the TRU.

BRIEF DESCRIPTION

According to an aspect of the disclosure, a vehicle is provided. The vehicle includes a first exhaust muffler, a transport refrigeration unit, and a fluid circuit. The first exhaust muffler is arranged to receive a first exhaust flow from a first engine. The transport refrigeration unit is arranged to condition an interior of a compartment of the vehicle. The transport refrigeration unit includes a second exhaust muffler that is arranged to receive a second exhaust flow from a second engine associated with the TRU. The fluid circuit includes a first heat exchanger and a valve assembly coupled to a second heat exchanger. The first heat exchanger has a first heat exchanger first inlet arranged to receive at least one of the first exhaust flow and the second exhaust flow, a first heat exchanger second inlet arranged to receive a coolant, a first heat exchanger first outlet arranged to release at least one of the first exhaust flow and the second exhaust flow, and a first heat exchanger second outlet. The second heat exchanger has a second heat exchanger first inlet arranged to receive the coolant from the first heat exchanger second outlet, a second heat exchanger second inlet arranged to receive gas from a gas tank supported on a vehicle body for storing gas for use in at least one of the first engine and the second engine, a second heat exchanger first outlet fluidly connected to the first heat exchanger second inlet, and a second heat exchanger second outlet arranged to direct gas to the TRU.

In accordance with additional or alternative embodiments, a fluid pump is fluidly connected to a fluid conduit that extends between the first heat exchanger second outlet and the second heat exchanger first inlet.

In accordance with additional or alternative embodiments, a controller is in communication with the fluid pump. The controller is programmed to operate the fluid pump responsive to at least one of a temperature of the valve assembly being less than a threshold, an ambient temperature being less than a threshold, and an ambient humidity being greater than a threshold.

In accordance with additional or alternative embodiments, a heater is fluidly connected to the fluid conduit.

In accordance with additional or alternative embodiments, a controller is in communication with the fluid pump and the heater. The controller is programmed to operate the fluid pump and the heater responsive to the first engine being off and at least one of a temperature of the valve assembly being less than a threshold, an ambient temperature being less than a threshold, and an ambient humidity being greater than a threshold.

According to yet another aspect of the disclosure, a fluid circuit provided with trucking vehicle having a transport refrigeration unit is disclosed. The fluid circuit includes a first heat exchanger, a valve assembly, and a fluid pump. The first heat exchanger is arranged as a dual flow heat exchanger that is arranged to receive an exhaust flow from an engine through an exhaust muffler to heat a coolant received from a second heat exchanger. The valve assembly is coupled to the second heat exchanger that is arranged receive the coolant to heat the gas received from a gas tank and provide the gas to the transport refrigeration unit. The fluid pump is arranged to facilitate a fluid flow of the coolant from the first heat exchanger to the second heat exchanger.

In accordance with additional or alternative embodiments, a controller is in communication with the fluid pump. The controller is programmed to operate the fluid pump responsive to at least one of a temperature of the valve assembly being less than a threshold, an ambient temperature being less than a threshold, and an ambient humidity being greater than a threshold.

In accordance with additional or alternative embodiments, the first heat exchanger includes a first heat exchanger first inlet arranged to receive the exhaust flow, a first heat exchanger second inlet arranged to receive the coolant, a first heat exchanger first outlet arranged to direct the exhaust outside of the fluid circuit, and a first heat exchanger second outlet arranged to direct the coolant to the second heat exchanger.

In accordance with additional or alternative embodiments, the second heat exchanger includes a second heat exchanger first inlet arranged to receive the coolant from the first heat exchanger second outlet, a second heat exchanger first outlet arranged to direct the coolant to the first heat exchanger second inlet, a second heat exchanger second inlet arranged to receive the gas, and a second heat exchanger second outlet fluidly connected to the transport refrigeration unit.

In accordance with additional or alternative embodiments, the first heat exchanger first inlet is arranged to receive the exhaust flow from an exhaust muffler associated with an engine arranged to facilitate propulsion of a vehicle.

In accordance with additional or alternative embodiments, the first heat exchanger first inlet is arranged to receive the exhaust flow from an exhaust muffler associated with an engine arranged to provide power to the transport refrigeration unit.

In accordance with additional or alternative embodiments, a heater is arranged to heat the fluid flow of the coolant from the first heat exchanger to the second heat exchanger.

According to yet another aspect of the disclosure, a method of warming a valve assembly is disclosed. The method includes receiving an exhaust flow through a first heat exchanger first inlet; heating a coolant received through a first heat exchanger second inlet with the exhaust flow; exhausting the exhaust flow through a first heat exchanger first outlet; and discharging heated coolant through a first heat exchanger second outlet.

In accordance with additional or alternative embodiments, the method further includes receiving the heated coolant from the first heat exchanger second outlet through a second heat exchanger first inlet; and heating a gas received through a second heat exchanger second inlet with the heated coolant.

In accordance with additional or alternative embodiments, the method further includes heating a valve assembly that is coupled to the second heat exchanger with at least one of the heated coolant and the heated gas.

In accordance with additional or alternative embodiments, the method further includes directing the heated coolant through a second heat exchanger second outlet to the first heat exchanger second inlet.

In accordance with additional or alternative embodiments, directing the gas through a second heat exchanger second outlet to a transport refrigeration unit.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

A detailed description of one or more embodiments of the disclosed apparatus and method are presented herein by way of exemplification and not limitation with reference to the Figures.

Figure 1:
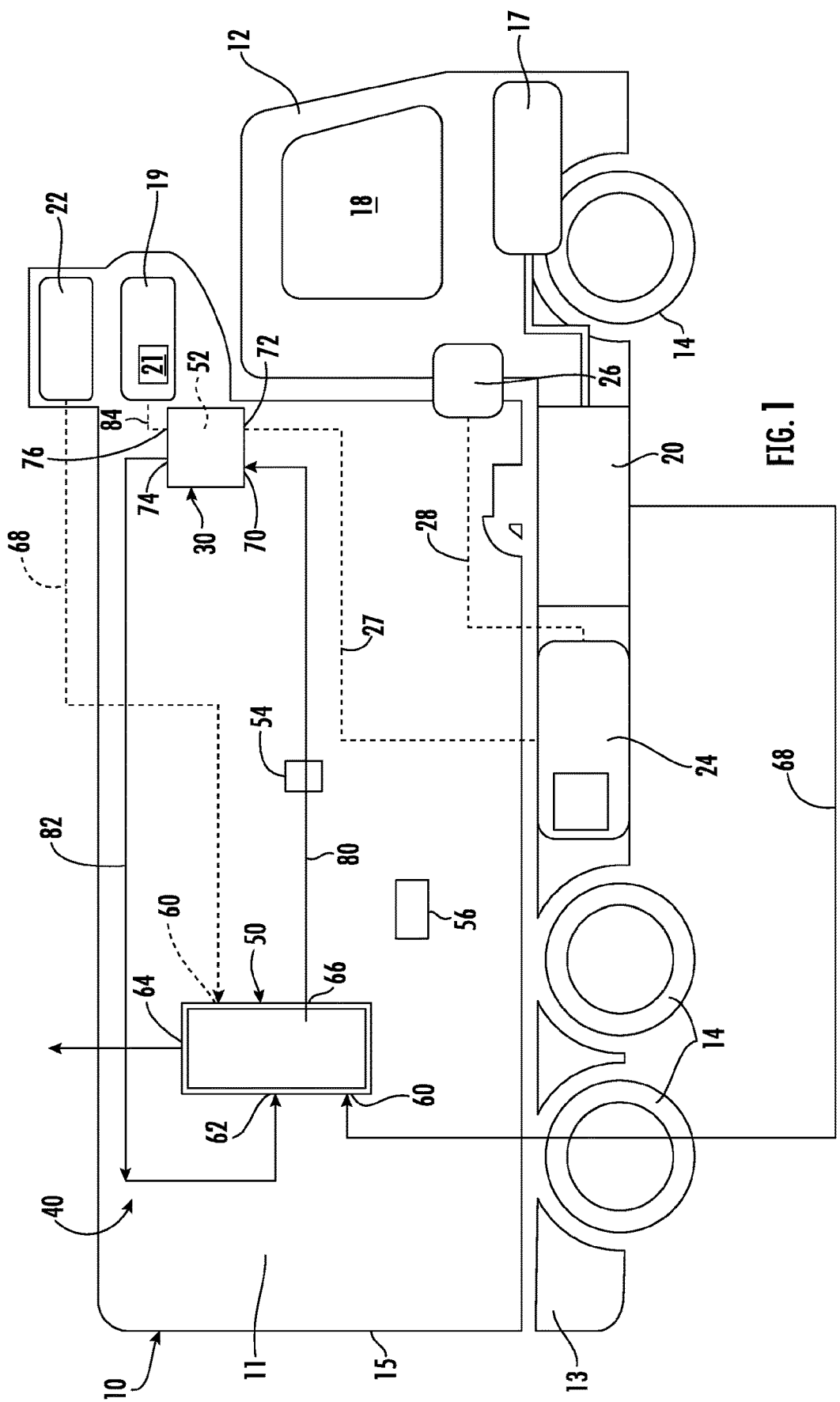
FIG. 1 is a side view of a trucking vehicle in accordance with embodiments of the present disclosure.

Referring to FIG. 1, a vehicle 10 such a trucking vehicle is schematically illustrated. The vehicle 10 includes a vehicle body 11 having a cab 12, a chassis/bed 13 that extends from the cab 12, wheels 14 that are arrayed beneath the cab 12 and the bed 13, and a container 15 that is supportively disposed on the bed 13. The vehicle 10 may be configured as a trucking vehicle although it is to be understood that other embodiments exist and that the use of the trucking vehicle as the example is only done for clarity and brevity. The vehicle 10 further includes a first engine 17, a cabin 18, and a TRU 19. The first engine 17 may be provided as a diesel engine, a compressed natural gas engine, or other type of internal combustion engine. The first engine 17 is arranged to generate power to facilitate propulsion of the vehicle 10. A first exhaust muffler 20 is associated with the first engine 17 and is arranged to receive a first exhaust flow from the first engine 17.

The cabin 18 is housed in the cab 12 and is formed to accommodate at least a driver as well as vehicle control elements, such as a steering wheel, a user interface device for controlling at least the first engine 17, movements of the vehicle 10, operations of the TRU 19, and a controller of a fluid circuit that is arranged to warm-up or heat a pressure regulating valve assembly associated with the delivery of a fuel, such as natural gas, to at least one of the first engine 17 and/or the TRU 19. The TRU 19 includes a second engine 21 that is configured to burn a fuel such as natural gas to provide power to the TRU 19 by which an interior of a compartment of the container 15 is conditioned. A second exhaust muffler 22 is associated with the second engine 21 and is arranged to receive a second exhaust flow from the second engine 21.

The vehicle 10 further includes a gas tank 24, which is supportable on the vehicle body 11 and, more particularly, on the bed 13. The gas tank 24 is arranged to store a fuel such as compressed natural gas for use in the first engine 17 and/or the TRU 19. A fluid conduit 27 extends between and is fluidly connected to the gas tank 24 and the TRU 19. A gas filling point 26 is disposed on a portion of the vehicle body 11 and is fluidly connected to the gas tank 24. A fluid conduit 28 extends between and is fluidly connected to the gas filling point 26 and the gas tank 24.

A valve assembly 30 is interposed between the gas tank 24 and the second engine 21 of the TRU 19. The valve assembly 30 is arranged to selectively facilitate or regulate a fluid flow of fuel from the gas tank 24 to the TRU 19 through the fluid conduit 27. The valve assembly 30 may be arranged as an electromagnetic two-way valve, as a balance pressure valve, a pressure regulator, or an expansion valve, that regulates a flow of fuel from the gas tank 24 to the second engine 21 of the TRU 19. The expansion of the fuel from the gas tank 24 within the valve assembly 30 or the flow of fuel through the valve assembly 30 may cause frosting or freezing of various components of the valve assembly 30 during low ambient temperature conditions and/or high humidity conditions. The frosting or freezing of various components of the valve assembly 30 may result in blockage of the valve assembly 30 that may inhibit or affect the flow of fuel from the gas tank 24 to TRU 19 or cause regulation of the fuel flow that is outside of designed ranges.

Figure 2:
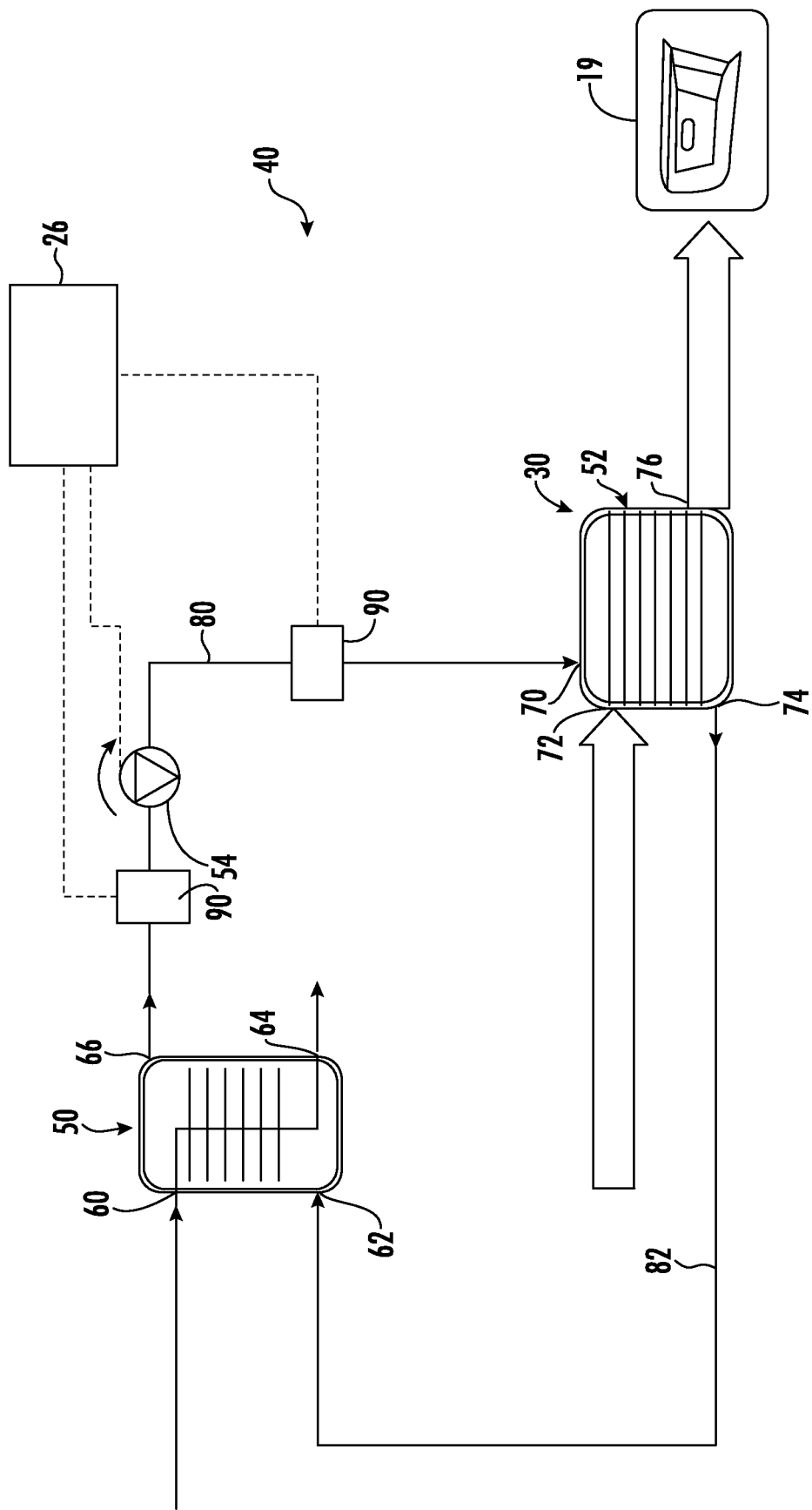
FIG. 2 is a schematic illustration of an independent fluid circuit arranged to heat a valve.

A fluid circuit 40 may be provided to warm-up or heat the valve assembly 30 to prevent or inhibit the freezing of components of the valve assembly 30 during low ambient temperatures and/or high humidity conditions. The fluid circuit 40 is arranged to utilize the hot exhaust gases from the first exhaust flow or the second exhaust flow to warm-up a fluid, such as a coolant, that flows through the fluid circuit 40 and warm up or heat the valve assembly 30. The fluid circuit 40 functions as an independent coolant loop that avoids or is isolated from the coolant loop associated with the first engine 17 of the vehicle 10 or the second engine 21 of the TRU 19. Referring to FIGS. 1 and 2, the fluid circuit 40 includes the valve assembly 30, a first heat exchanger 50, a second heat exchanger 52 coupled to the valve assembly 30, a fluid pump 54, and a controller 56.

The first heat exchanger 50 is arranged as a dual flow heat exchanger that receives an exhaust flow from the first engine 17 via the first exhaust muffler 20 and/or an exhaust flow from the second engine 21 via the second exhaust muffler 22 and heats a fluid, such as a coolant, received from the second heat exchanger 52, with the exhaust flow. The first heat exchanger 50 is arranged to direct the heated coolant towards the valve assembly 30 and the second heat exchanger 52. The first heat exchanger 50 includes a first heat exchanger first inlet 60, a first heat exchanger second inlet 62, a first heat exchanger first outlet 64, and a first heat exchanger second outlet 66.

The first heat exchanger first inlet 60 is arranged to receive at least one of the first exhaust flow from the first exhaust muffler 20 and the second exhaust flow from the second exhaust muffler 22. Piping or a conduit 68 extends between and fluidly connects the first heat exchanger first inlet 60 to at least one of the first exhaust muffler 20 and/or the second exhaust muffler 22. The coupling of the first heat exchanger first inlet 60 with the first exhaust muffler 20 associated with the first engine 17 provides the shortest distance of the conduit 68 between the vehicle's exhaust and the first heat exchanger 50 as well as provides a more compact design of the fluid circuit 40 that may be located closer to the chassis 13 of the vehicle 10. The first heat exchanger second inlet 62 is arranged to receive coolant from the second heat exchanger 52. The first heat exchanger first outlet 64 is arranged to release or exhaust at least one of the first exhaust flow and/or the second exhaust flow outside of the fluid circuit 40, such as to the atmosphere. The first heat exchanger second outlet 66 is arranged to direct the coolant that is heated by the exhaust flow towards the second heat exchanger 52.

The valve assembly 30 is coupled to or integrated with the second heat exchanger 52. The second heat exchanger 52 is a dual flow heat exchanger that receives heated coolant from the first heat exchanger 50 and heats the gas that is received from the gas tank 24 to heat the valve assembly 30 or directly heats the valve assembly 30 with the heated coolant from the first heat exchanger 50 while the valve assembly regulates the flow of gas from the gas tank 24 to the TRU 19. The valve assembly 30 and the second heat exchanger 52 may be formed together to define a single pressure regulating/valve unit such that the valve assembly 30 is at least one of thermally connected and/or fluidly connected to the second heat exchanger 52. The second heat exchanger 52 includes a second heat exchanger first inlet 70, a second heat exchanger second inlet 72, a second heat exchanger first outlet 74, and a second heat exchanger second outlet 76.

The second heat exchanger first inlet 70 is arranged to receive the heated coolant from the first heat exchanger second outlet 66 through a fluid conduit 80 that extends between the first heat exchanger second outlet 66 and the second heat exchanger first inlet 70. The second heat exchanger second inlet 72 is arranged to receive the gas from the gas tank 24 through the fluid conduit 27. The second heat exchanger first outlet 74 is fluidly connected to the first heat exchanger second inlet 62 through a fluid conduit 82. The second heat exchanger first outlet 74 is arranged to direct coolant towards the first heat exchanger second inlet 62. The second heat exchanger second outlet 76 is fluidly connected to the second engine 21 of the TRU 19 through a fluid conduit 84 that may be an extension of the fluid conduit 27. The second heat exchanger second outlet 76 is arranged to direct heated gas that was heated by the heated coolant towards the TRU 19. A valve member of the valve assembly 30 is disposed between the second heat exchanger second inlet 72 and the second heat exchanger second outlet 76. The valve member is arranged to regulate or selectively facilitate or inhibit the fluid flow of gas or heated gas between the second heat exchanger second inlet 72 and the second heat exchanger second outlet 76.

The fluid pump 54 is disposed between the first heat exchanger 50 and the valve assembly 30 that is coupled to the second heat exchanger 52. The fluid pump 54 may be an electric water pump. The fluid pump 54 is fluidly connected to the fluid conduit 80 and is arranged to facilitate a fluid flow of the coolant that is heated by the first heat exchanger 50 to the second heat exchanger 52.

In at least one embodiment, a heater 90 may be provided. The heater 90 may be an electric heater that is arranged to heat the coolant provided with the fluid circuit 40 should the first engine 17 be off and not providing a hot exhaust flow. The heater 90 is fluidly connected to the fluid conduit 80 and is arranged to heat the fluid flow of the coolant from the first heat exchanger 50 to the second heat exchanger 52. The heater 90 may be disposed between the first heat exchanger 50 and the fluid pump 54 or may be disposed between the fluid pump 54 and the valve assembly 30 that is coupled to the second heat exchanger 52.

The controller 56 may be a separately provided controller or may be provided as part of the user interface device as previously described. The controller 56 includes input communication channels that are arranged to receive signals, data, information, or messages that are indicative of an ambient temperature, a temperature of the valve assembly 30, an ambient humidity, a storage temperature of the gas within the gas tank 24, or the like. The controller 56 includes output communication channels that are arranged to provide signals, commands, data, information, or messages to the fluid pump 54 and/or the heater 90. The controller 56 includes at least one processor that is programmed to output signals or commands or messages via the output communication channels based on signals, data, information, or messages received via the input communication channels.

The controller 56 is programmed to command at least one of the fluid pump 54 and the heater 90 to operate responsive to at least one of a temperature of the valve assembly 30 being less than a threshold temperature, an ambient temperature being less than a threshold ambient temperature, and an ambient humidity being greater than a threshold ambient humidity. The controller 56 is programmed to command the fluid pump 54 and the heater 90 to operate responsive to the first engine 17 being off and at least one of a temperature of the valve assembly being less than a threshold temperature, an ambient temperature being less than a threshold ambient temperature, and an ambient humidity being greater than a threshold ambient humidity.

The fluid circuit 40 utilizes hot exhaust gases to warm up a coolant and/or a gas to warm up or heat the valve assembly 30 via the second heat exchanger 52 to inhibit the frosting, freezing, or blocking of components of the valve assembly 30 to ensure the flow of gas from the gas tank 24 to the TRU 19. The fluid circuit 40 may also utilize a heater 90 to heat a coolant and/or gas to warm up or heat the valve assembly 30 to inhibit frosting, freezing, or blocking of components of the valve assembly 30. The fluid circuit 40 functions as an independent loop that avoids modification of the cooling circuits or cooling systems associated with the first engine 17 of the vehicle 10 and the second engine 21 of the TRU 19.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A vehicle, comprising:
    a first exhaust muffler arranged to receive a first exhaust flow from a first engine;
    a transport refrigeration unit (TRU) arranged to condition an interior of a compartment of the vehicle, comprising:
        a second exhaust muffler arranged to receive a second exhaust flow from a second engine associated with the TRU; and
    a fluid circuit, comprising:
        a first heat exchanger having a first heat exchanger first inlet arranged to receive at least one of the first exhaust flow and the second exhaust flow, a first heat exchanger second inlet arranged to receive a coolant, a first heat exchanger first outlet arranged to release at least one of the first exhaust flow and the second exhaust flow, and a first heat exchanger second outlet, and a valve assembly coupled to a second heat exchanger having a second heat exchanger first inlet arranged to receive the coolant from the first heat exchanger second outlet, a second heat exchanger second inlet arranged to receive gas from a gas tank supported on a vehicle body for storing gas for use in at least one of the first engine and the second engine, a second heat exchanger first outlet fluidly connected to the first heat exchanger second inlet, and a second heat exchanger second outlet arranged to direct gas to the TRU.

2. The vehicle of claim 1, further comprising:

a fluid pump fluidly connected to a fluid conduit that extends between the first heat exchanger second outlet and the second heat exchanger first inlet.

3. The vehicle of claim 2, further comprising:

a controller in communication with the fluid pump, the controller programmed to operate the fluid pump responsive to at least one of a temperature of the valve assembly being less than a threshold, an ambient temperature being less than a threshold, and an ambient humidity being greater than a threshold.

4. The vehicle of claim 2, further comprising:

a heater fluidly connected to the fluid conduit.

5. The vehicle of claim 4, further comprising:

a controller in communication with the fluid pump and the heater, the controller programmed to operate the fluid pump and the heater responsive to the first engine being off and at least one of a temperature of the valve assembly being less than a threshold, an ambient temperature being less than a threshold, and an ambient humidity being greater than a threshold.

6. A fluid circuit provided with trucking vehicle having a transport refrigeration unit, comprising:

a first heat exchanger arranged as a dual flow heat exchanger that is arranged to receive an exhaust flow from an engine through an exhaust muffler to heat a coolant received from a second heat exchanger;

a valve assembly coupled to the second heat exchanger that is arranged receive the coolant to heat the gas received from a gas tank and provide the gas to the transport refrigeration unit; and a fluid pump arranged to facilitate a fluid flow of the coolant from the first heat exchanger to the second heat exchanger.

7. The fluid circuit of claim 6, further comprising:

a controller in communication with the fluid pump, the controller programmed to operate the fluid pump responsive to at least one of a temperature of the valve assembly being less than a threshold, an ambient temperature being less than a threshold, and an ambient humidity being greater than a threshold.

8. The fluid circuit of claim 6, wherein the first heat exchanger includes:

a first heat exchanger first inlet arranged to receive the exhaust flow, a first heat exchanger second inlet arranged to receive the coolant, a first heat exchanger first outlet arranged to direct the exhaust outside of the fluid circuit, and a first heat exchanger second outlet arranged to direct the coolant to the second heat exchanger.

9. The fluid circuit of claim 6, wherein the second heat exchanger includes:

a second heat exchanger first inlet arranged to receive the coolant from the first heat exchanger second outlet, a second heat exchanger first outlet arranged to direct the coolant to the first heat exchanger second inlet, a second heat exchanger second inlet arranged to receive the gas, and a second heat exchanger second outlet fluidly connected to the transport refrigeration unit.

10. The fluid circuit of claim 8, wherein the first heat exchanger first inlet is arranged to receive the exhaust flow from an exhaust muffler associated with an engine arranged to facilitate propulsion of a vehicle.

11. The fluid circuit of claim 8, wherein the first heat exchanger first inlet is arranged to receive the exhaust flow from an exhaust muffler associated with an engine arranged to provide power to the transport refrigeration unit.

12. The fluid circuit of claim 6, further comprising:

a heater arranged to heat the fluid flow of the coolant from the first heat exchanger to the second heat exchanger.

13. A method of warming a valve assembly, comprising:

receiving an exhaust flow through a first heat exchanger first inlet;

heating a coolant received through a first heat exchanger second inlet with the exhaust flow;

exhausting the exhaust flow through a first heat exchanger first outlet; and discharging heated coolant through a first heat exchanger second outlet towards a second heat exchanger assembly that is coupled to a valve assembly to heat the valve assembly.

14. The method of claim 13, further comprising:

receiving the heated coolant from the first heat exchanger second outlet through a second heat exchanger first inlet; and heating a gas received through a second heat exchanger second inlet with the heated coolant.

15. The method of claim 14, further comprising:

heating the valve assembly that is coupled to the second heat exchanger with at least one of the heated coolant and the heated gas.

16. The method of claim 14, further comprising:

directing the heated coolant through a second heat exchanger second outlet to the first heat exchanger second inlet.

17. The method of claim 16, further comprising:

directing the gas through a second heat exchanger second outlet to a transport refrigeration unit.

* * * * *